United States Patent [19]
Hess

[11] Patent Number: 5,168,349
[45] Date of Patent: Dec. 1, 1992

[54] SYNCHRONIZATION OF COLOR CARRIERS OF DIFFERENT COLOR TV STANDARDS HAVING THE SAME LINE FREQUENCY

[75] Inventor: Heinz Hess, Weiterstadt, Fed. Rep. of Germany

[73] Assignee: BTS Broadcast Television Systems GmbH, Darmstadt, Fed. Rep. of Germany

[21] Appl. No.: 665,368

[22] Filed: Mar. 6, 1991

[30] Foreign Application Priority Data

Mar. 26, 1990 [DE] Fed. Rep. of Germany ....... 4009587

[51] Int. Cl.$^5$ .......................................... H04N 9/465
[52] U.S. Cl. ........................................ 358/17; 358/19
[58] Field of Search .................. 358/17, 18, 19, 158, 358/324

[56] References Cited

U.S. PATENT DOCUMENTS

| | | | |
|---|---|---|---|
| 4,268,852 | 5/1981 | Nakamura | 358/17 |
| 4,511,915 | 4/1985 | Van der Valk et al. | 358/17 |
| 4,575,757 | 3/1986 | Aschwanden | 358/17 |
| 4,679,005 | 7/1987 | Tatami | 358/17 |

FOREIGN PATENT DOCUMENTS

1758/76 11/1976 Fed. Rep. of Germany .
2652904A1 5/1978 Fed. Rep. of Germany .

Primary Examiner—Edward L. Coles, Sr.
Assistant Examiner—Kim Yen Vu
Attorney, Agent, or Firm—Frishauf, Holtz, Goodman & Woodward

[57] ABSTRACT

When two color television standards prescribe the same horizontal scanning frequency but different color carrier frequencies, one of them, for example, requiring a frequency providing a one-half line offset to the horizontal scanning frequency (NTSC Standard) and the other requiring a three-quarter line offset (PAL-M Standard), each color carrier frequency being locked to the common line frequency, a modified phase locked loop circuit makes it possible to synchronize the color carrier frequencies to each other. The oscillator at the color carrier frequency of one standard has its output compared, in a phase comparison stage, with the color synchronization signal of the other standard. The output of the phase comparison stage is supplied to a sample-and-hold circuit which is sampled during the presence of that color synchronizing signal in every fourth line. The content of the sample-and-hold circuit is passed through a low-pass filter and then supplied to the control input of the oscillator, thus locking the latter to the color carrier of the other standard.

2 Claims, 1 Drawing Sheet

FIG. 1
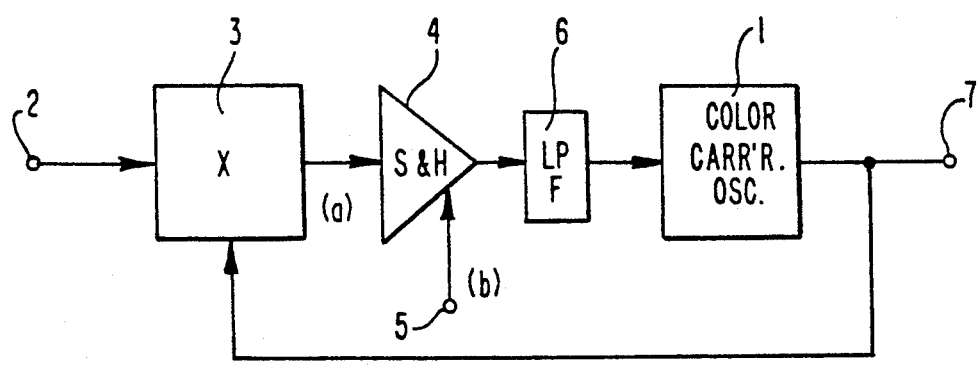
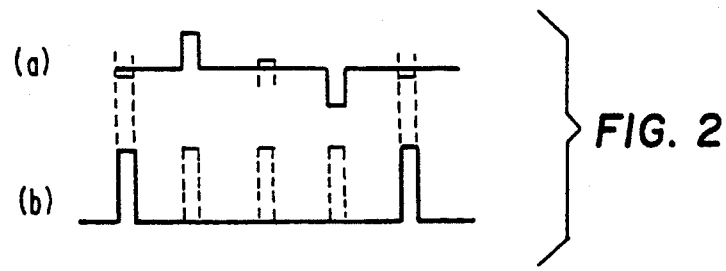
FIG. 2

SYNCHRONIZATION OF COLOR CARRIERS OF DIFFERENT COLOR TV STANDARDS HAVING THE SAME LINE FREQUENCY

The invention concerns the synchronization of television color carriers of certain different color television standards, for example, the NTSC and the PAL-M Standard, which have the same line frequency so that the line frequencies can be mutually synchronized, while the chrominance subcarrier frequencies are not the same.

The PAL-M Standard, which is used in Brazil, has a color carrier offset of three-quarters of a line, while the NTSC Standard has a chrominance subcarrier offset of half a line so that its frequency will fall halfway between the harmonics of the line scanning (horizontal) frequency. Both these standards have the same horizontal and vertical scanning frequencies.

A solution to the locking into step of a chrominance subcarrier with half-line offset and a chrominance subcarrier with one-quarter or three-quarter line offset is known from German Patent Document 26 52 904 A1 in which the chrominance subcarrier of one standard is generated in a controllable quartz-stabilized oscillator, of which the outward voltage is modulated by an alternating current of one-quarter of the line frequency. The corresponding sideband of that modulated voltage is compared with the color carrier of the other standard with reference to the phase position of the respective color carriers. This known circuit, however, is complicated and expensive, also relatively vulnerable to disturbances, and requires much alignment.

SUMMARY OF THE INVENTION

It is an object of the present invention to provide a simple and reliable circuit apparatus for synchronizing chrominance subcarriers of different offset to each other.

Briefly, in a phase comparison circuit of a phase locked loop (PLL) the inputs to be compared are the output of an oscillator providing a chrominance subcarrier in accordance with one of the two standards and an output derived from the color sync burst signal produced in accordance with the other of the two standards. The output of the phase comparison circuit is then supplied to a sample-and-hold circuit which is interposed between the phase comparison circuit and the usual low-pass filter of a PLL that delivers a control voltage for the oscillator. Sampling pulses are generated so as to deliver a sampling pulse to the sample-and-hold circuit during the presence of the aforesaid color sync burst signal at regular intervals of four line periods. The result is to lock the chrominance subcarrier generated by the oscillator in the phase locked loop to the chrominance subcarrier from which is derived the color sync burst signal of the other standard.

The circuit apparatus of the invention has the advantage that synchronization to each other of two chrominance subcarriers having different offsets to the horizontal scanning frequency can be carried out with reference to a common reference frequency by the simplest and most reliable means.

BRIEF DESCRIPTION OF THE DRAWINGS

The invention is further described by way of illustrative example with reference to the annexed drawing, in which:

FIG. 1 is a circuit block diagram of an embodiment of apparatus according to the invention, and FIG. 2 is a timing diagram explaining the operation of the circuit of FIG. 1.

DESCRIPTION OF THE ILLUSTRATED EMBODIMENT

A preferred field of application of the invention is the locking to each other of the chrominance subcarriers respectively of the NTSC Standard and of the PAL-M Standard (which is used, for example, in Brazil). It is well known that both of these standards provide for the same horizontal and vertical scanning frequencies but differ, however, in their chrominance subcarrier frequencies $F_C$, as follows:

| Thus, for NTSC | $F_{CN} = (n - \frac{1}{2})f_H$ |
|---|---|
| and for PAL-M | $F_{CP} = (n - \frac{1}{4})f_H$. | where in both cases $n=228$ and $f_H$, which is the television line frequency, is 15.73 KHz.

The two chrominance subcarriers $F_{CN}$ and $F_{CP}$ are both locked to the same horizontal scanning (line) frequency by means that need not be described further, and thus differ merely by $(227.5 - 227.25)f_H = 0.25\ f_H$, which is to say by $\frac{1}{4}$ of the horizontal (line) frequency. Since, therefore, the null transition phase of both color carriers will repeatedly have a coincidence in every fourth line, a phase comparison at these times can make possible the derivation of a control voltage for the regulation of one of the color carrier oscillators. This is implemented in the embodiment illustrated in FIG. 1.

In the apparatus there diagrammed for synchronizing the chrominance subcarriers to each other, the chrominance subcarrier oscillator 1 generates a chrominance subcarrier signal conforming the PAL-M Standard. The circuit shown is for synchronizing the oscillator 1 to the NTSC chrominance signal supplied at the terminal 2. Such circuits are of advantage, for example, in studio equipment, preferably in the presence of transcoders for converting color television signals from one standard into corresponding color television signals of the other standard. Further details of still other useful applications of the illustrated embodiment will be evident to those skilled in the art and need not be described further here.

The NTSC chrominance signal, which is well known, contains a color sync burst signal appearing in intervals occurring at the line frequency in the horizontal blanking interval is supplied from the terminal 2. one input of a phase comparison circuit 3, to the other input of which is supplied the color carrier generated in the oscillator 1 in accordance with the PAL-M Standard.

In the phase comparison stage 3, the NTSC chrominance signal is multiplied by the PAL-M chrominance subcarrier. That produces a demodulation of the color sync burst signal of the chrominance signal. The output signal of the phase comparison stage containing the demodulated color synchronizing signal, shown in line (a) of FIG. 2, is then supplied to a following sample-and-hold circuit 4, the sampling input 5 of which receives a sequence of sample timing pulses shown in line (b) of FIG. 2. These sampling pulses are made to occur only in every fourth line and are timed to occur during the presence (within the duration) of the color sync burst signal, by the pulse generator, the demodulated NTSC color sync burst signal is sampled on these occasions and this value is stored every time in the circuit 4. Every voltage value of the demodulated sync burst color signal thus made available over 4 successive line intervals is then supplied to the control input of the chrominance subcarrier oscillator 1, but only after passing through a low-pass filter 6 consisting of a passive proportional-integral circuit. In this way, phase and frequency regulation of the chrominance subcarrier oscillator 1 is accomplished, so that at its output 7 a regulated and phase-locked chrominance subcarrier signal conforming to the PAL-M Standard is made available.

Of course with this synchronizing circuit, conversely, a chrominance subcarrier $F_{CN}$ conforming to the NTSC Standard can be controllably generated which is similarly locked to the color sync burst signal of a video signal according to the PAL-M Standard. It is also possible with this synchronizing circuit apparatus to synchronize the chrominance subcarrier oscillator 1 to a chrominance subcarrier signal of the same standard supplied at the input 2, without any necessity of changing the frequency of the sampling pulse sequence in any way. Thus, the circuit apparatus of the present invention may be used for another purpose when the chrominance subcarrier oscillator 1 does not need to be locked into step with a chrominance subcarrier frequency of a different standard.

Although the invention has been described with reference to a particular illustrative example, it will be recognized that modifications and variations are possible within the inventive concept.

I claim:

1. A circuit apparatus for synchronizing with each other the chrominance subcarriers of the respective chrominance signals of two color television signals, which respectively conform to two different television signal standards which provide for the same line frequency but which differ in that one said standard provides for a chrominance subcarrier with a half-line offset with respect to the line frequency and the other of said standards provides for a chrominance subcarrier with a quarter-line offset or a three-quarter-line offset with respect to the line frequency, comprising:

a source (2) of color synch bursts of the chrominance subcarrier a first one of said television standards;

an oscillator (1) of controllable frequency for generating a chrominance subcarrier of a second one of said television standards, said oscillator having a frequency control input;

a phase comparison circuit having an output and having inputs connected to said color sync burst source (2) and to said oscillator (1) for producing at its output a signal indicative of phase deviation between said color sync bursts of said first television signal standard and said chrominance subcarrier of said second television signal standard;

a sample-and-hold circuit (4) connected for receiving said output signal of said phase comparison circuit which is indicative of phase deviation and having a sample timing input as well as an output;

means for generating pulses of a duration and timing which is within the intervals in which said color sync bursts are present at said color burst source (2) and for deriving from said pulses, by eliminating three consecutive pulses between all remaining successive pulses, to produce a sequence of sample timing pulses occurring only in every fourth television line during the presence of a said color sync burst of said first television signal standard and supplying said sequence of timing pulses to said sample timing input of said sample-and-hold circuit, and a low-pass filter (6) having an input connected to said output of said sample-and-hold circuit and having an output connected to said frequency control input of said oscillator.

2. The circuit apparatus of claim 1, wherein said phase comparison circuit means is a multiplier circuit.

* * * * *